US 6,590,965 B1

(12) United States Patent
Poole et al.

(10) Patent No.: US 6,590,965 B1
(45) Date of Patent: Jul. 8, 2003

(54) ENHANCED VOICE MAIL CALLER ID

(75) Inventors: R. Andrew Poole, Round Hill, VA (US); Robert D. Farris, Sterling, VA (US); David H. Cave, Fairfax, VA (US); Dale L. Bartholomew, Vienna, VA (US)

(73) Assignee: Verizon Communications, Inc., New York, NY (US)

( * ) Notice: Subject to any disclaimer, the term of this patent is extended or adjusted under 35 U.S.C. 154(b) by 37 days.

(21) Appl. No.: 09/917,803

(22) Filed: Jul. 31, 2001

(51) Int. Cl.$^7$ ............................................. H04M 1/652
(52) U.S. Cl. ............................... 379/88.19; 379/142.06; 379/207.15
(58) Field of Search .......................... 379/67.1, 88.14, 379/88.16, 88.19, 88.2, 88.21, 88.22, 127.01, 142.01, 142.06, 201.01, 207.15, 220.01

(56) References Cited

U.S. PATENT DOCUMENTS

| | | | |
|---|---|---|---|
| 4,551,581 A | 11/1985 | Doughty | |
| 4,582,956 A | 4/1986 | Doughty | |
| 5,029,199 A | 7/1991 | Jones et al. | |
| 5,193,110 A | 3/1993 | Jones et al. | |
| 5,263,080 A | 11/1993 | Jones et al. | |
| 5,497,414 A | 3/1996 | Bartholomew | |
| 5,586,177 A | 12/1996 | Farris et al. | |
| 5,708,702 A | 1/1998 | De Paul et al. | |
| 5,724,412 A * | 3/1998 | Srinivasan | 379/93.23 |
| 5,812,639 A | 9/1998 | Bartholomew et al. | |
| 5,850,435 A * | 12/1998 | Devillier | 379/374.02 |
| 5,857,013 A | 1/1999 | Yue et al. | |
| 5,875,232 A * | 2/1999 | Wolf | 379/88.19 |
| 5,898,667 A | 4/1999 | Longfield et al. | |
| 5,949,865 A * | 9/1999 | Fusinato | 379/221.09 |
| 6,028,921 A * | 2/2000 | Malik et al. | 379/201.04 |
| 6,061,432 A | 5/2000 | Wallace et al. | |
| 6,094,574 A | 7/2000 | Vance et al. | |
| 6,105,034 A | 8/2000 | Buckler | |
| 6,493,443 B1 * | 12/2002 | Furman et al. | 379/210.01 |
| 2003/0026413 A1 * | 2/2003 | Brandt et al. | 379/230 |

OTHER PUBLICATIONS

Eagle ® 5 SAS [online], Tekelec, Inc. 1999–2001 [retrieved on Apr. 16, 2001]. Retrieved from the Internet: <URL:http://www.tekelec.com/productprotfolio/eagle5sas/>.

* cited by examiner

Primary Examiner—Scott L. Weaver
(74) Attorney, Agent, or Firm—McDermott, Will & Emery

(57) ABSTRACT

The telephone network is adapted to supply name and number information to a voice mail system with a forwarded call. The voice mail system stores the name and number type caller ID information in association with the subscriber's mailbox. The system may store this information even if the caller does not actually deposit a voice mail message. Later, while the subscriber reviews the mailbox contents, the system offers a verbal announcement of the name and number. A central office switching system may query a line identification database to obtain the name for a caller ID service to the customer premises, in which case, that switching system forwards the name and number to the voice mail system with the forwarded call. In an alternative embodiment, the voice mail system launches the query and receives the name in a response, through the interoffice signaling network.

19 Claims, 6 Drawing Sheets

ENHANCED VOICE MAIL CALLER ID

FIELD OF THE INVENTION

The present invention relates to voice mail communication, more particularly to the ability to provide the complete set of information, normally provided as 'Caller ID' information on the subscriber line, as an announcement accompanying a recorded voice mail message from the caller. For example, the voice mail system can obtain and announce the number and an associated name, with each voice mail message or for each call even if the caller did not leave a message.

BACKGROUND

Network-based voice mail service has become commonplace in business environments and is becoming an increasingly popular alternative to answering machines for residential telephone customers. A voice mail system is a specialized computer or set of interconnected computers. The voice is generally digitized, usually at a much lower rate than the 64 Kb/s encoding that the central offices of the telephone network use for voice traffic through the switched network. The digitized voice is stored in compressed form on a hard disk that maintains the voice mail operating system, system prompts, and greetings, and the messages themselves. A processor controls the compressing, storing, retrieving, forwarding and purging of files. A comprehensive review of exemplary voice mail systems and voice messaging systems is disclosed in U.S. Pat. No. 5,812,639 to Bartholomew et al.

Many voice mail systems today provide some information about the call with the stored audio signal. This voice mail identification is normally associated with the telephone number of the voice mail subscriber. As the ability to send return messages is a normal and expected attribute of voice mail communication, data message protocol provides for message headings to include both sending and receiving addresses. Thus, in conventional systems, the receiving voice mailbox typically gains access to the calling number information as part of its processing of each incoming call.

If received, the voice mail system stores the calling number and will announce that number to the subscriber during message retrieval and/or related mailbox access operations. The information may also be used to enable call-back to the party that left the message for the subscriber or for forwarding of a newly recorded message from the subscriber to a mailbox of the original calling party U.S. Pat. No. 6,061,432 to Wallace et al., for example, discloses a voice mail system with signaling connectivity to the inter-office signaling portion of the switched telephone network. This enables the voice mail system to query other network nodes, such as an end office switch or an intelligent signaling transfer point, to obtain routing information used to forward a reply message to an appropriate box of the original caller in a remote voice mail system.

However, the calling party information is not always available to the voice mail system. The information may be blocked, because of privacy concerns. More often, one of the carriers involved in delivering the call to the voice mail system does not have the capability, or for business reasons does not agree, to supply the calling party number to the serving end office switch. Hence, when the call comes in, the end office switch can not supply any such information to the voice mail system with the forwarded call. In many cases, a subscriber receives voice mail messages but receives no related network information about the calling party.

This situation can be a particularly bothersome where the voice mail message stored by the mail system is inadequate. The caller may have left an incomplete message, or the system may have received no audio message at all if the caller opted to hang-up quickly. A subscriber may find several 'hang-ups' recorded as messages in his or her voice mailbox with no attendant information about the calling party. As a result, the subscriber has no way to determine the nature of the calls or the identity of the callers for call-back or nuisance tracing purposes.

Caller identification or "caller ID" is another increasingly popular telephone service. Caller ID is a telephone on-hook capability that provides a called party with information about the caller before the called party answers the incoming call. Conventionally, such information includes the date and time of the call and the caller's telephone number. Essentially, the telephone network identifies the telephone number associated with the line or instrument used by the calling party and supplies the number and time to a display device at the called customer's premises. Subscribers having integrated service digital network (ISDN) type service receive the caller ID data, for display at the time of an incoming call, in the form of a data message, which the end office switch transmits over the D-channel.

For analog telephone customers, however, existing caller ID utilizes in-band transmission technology similar to that described in U.S. Pat. Nos. 4,582,956 and 4,551,581 to Doughty. In such a system, the end office switch connected to the called party's line transmits directory number data for the calling party's telephone line as frequency shift keyed (FSK) data inserted in the silent interval between ringing signal pulses applied to the called party's line. The receiving apparatus includes a line interface unit, a converter, a control circuit and a display unit. A frequency shift keyed (FSK) signal representing the special service information (e.g. date, time and number) is filtered from the ringing signals by the line interface unit. The converter detects the FSK signal and demodulates the special service information from the FSK signal. Following detection of the FSK signal, the control circuit receives and stores the information, for display and other purposes.

For several years, local telephone exchange carriers have offered an enhanced form of caller ID, sometimes referred to as "Caller ID Deluxe" service. This enhanced service utilizes intelligent network type call processing to access a Line Information Database (LIDB) to translate the calling party's directory number into corresponding name data. The end office switch forwards the name data and the normal caller ID telephone number, as an ISDN data message (D-channel) or as FSK encoded data inserted in the silent intervals between ringing signals.

The terminal devices for caller ID normally retain the information at least for some period of time. Hence, over time the terminal builds-up a list of several of the most recent numbers and possibly names for calling parties. If calls rolled-over into voice mail from a ring-no-answer at the subscriber station, the caller ID data is delivered to the terminal in the normal fashion, before the forwarding. Hence, the terminal stores the number and name data in its memory. The subscriber can review the list and use the data to call-back at a later time. The terminal does not receive the caller ID data if the line is busy, unless the subscriber also has call waiting deluxe service (name and number delivery during call waiting). In the normal busy situation or if the subscriber has selectively activated forwarding to voice mail, the central office switch redirects the call to the voice mail system without delivering any type of caller ID information to the subscriber's equipment.

Even if received on a call that terminated in voice mail, the information stored in the caller ID terminal may not be easy to correlate with messages retrieved from voice mail or 'hang-up' calls. The subscriber reviewing the voice mail messages would need to concurrently scan through the list of caller IDs in the terminal device, to see if there was any corresponding data relating to the messages in his/her voice mailbox. This is often impractical and inconvenient, even if all the data is present in the caller ID terminal memory. Also, the subscriber may want to retrieve voice mail messages while away from home or office, in which case the caller ID terminal with the relevant data is not available for concurrent review.

It would be preferable to obtain information similar to caller ID with stored voice mail messages. Typically, when the switch forwards a call over a line to a voice mail system, the switch sends various call-related information over a parallel data link, such as a simplified message desk interface (SMDI) link. The switch, however, generates the SMDI data stream from other information about the call and does not specifically use the same information as used for caller ID service. Hence, the full caller ID information is not provided to the voice mail system if the switch serving the subscriber forwards a call to voice mail. The switch instead relies on the calling party information retained from the initial delivery of the call to that switch, and conventionally the switch delivers only that number to the voice mail system via the SMDI link. In particular, with existing technologies, the SMDI link data for a forwarded call will not include the name information from the LIDB database. Hence, the voice mail system does not receive the name information from the subscriber's Caller ID Deluxe service, even though the subscriber has paid the carrier to receive that information.

Some voice mail systems have offered name information with voice mail messages. Most existing systems with this feature, however, provide the information only for intra-system calls, that is to say between parties on the same or interconnected voice mails systems. Essentially, such.systems rely on the fact that the caller is a subscriber using the same node or interconnected nodes as used by the called-party subscriber. Because the system already knows the identity the party normally associated with the calling station, from its internal information, the system can store that information for later presentation with the message at time of retrieval. This type of approach, however, does not work with the general case where the caller is not a subscriber to the same voice mail service and does not serve to extend the subscriber's caller ID service to their associated voice mailbox.

There have been attempts to address these types of issues in some related areas. For example, U.S. Pat. No. 6,094,574 to Vance et al. discloses a paging system that provides caller identification to the pager. The system includes an IVR unit for prompting a caller to enter a call back number and a caller base number. The base number is a number associated with the identity of the caller, such as the caller's home telephone number or main business telephone number. The paging system further includes a caller identification server for obtaining caller identification information from a telephone listing database, shown as the line identification database (LIDB) of the public switched telephone network. The paging system may perform various steps to determine caller identification from the caller's base number, such as searching a reverse look-up telephone directory to obtain a name associated with the base telephone number. If the data is not available in the reverse directory, the system then queries the LIDB database for name information. Name and number information is transmitted to and displayed on the pager. One embodiment also offers an associated voice mail option in which the caller may store a message for later review/retrieval by the paged subscriber. However, the Vance et al. system relies on the pager display to provide the caller ID information, essentially analogous to display on a caller ID terminal. The voice message is referenced by a message number. Apparently, the caller ID is only sent to the pager, without storing the data in association with the voice message. Consequently, the subscriber must use the pager to obtain that information at the time of listening to playback of the message. Vance et al. did not recognize the desirability of listening to the caller ID data at the time of reviewing stored messages or at the time of listening to an actual message.

U.S. Pat. No. 5,857,013 to Yue et al. discloses an automatic personal number communications system for a roaming subscriber. The service routes calls to various destinations in the wireless domain as well as to landline telephone stations. Certain features of the overall service are implemented on a service circuit node interfaced with the public switched telephone network, to provide ancillary services such as voice mail with call-back and paging. The voice mail service provides the subscriber with the calling line number of the message source and with correlated information as to the identity of the source. Apparently, the platform receives the calling line number with any call routed to the platform, and records that number for any call resulting in a default to the internal voice mail service. The platform seeks a match of the calling line number to a listing in a reverse white pages directory, to provide the identity of the calling party. If there is no match, the system preferably requests the caller to record identification information, such as the name of the caller. The Yue et al. system is specially tailored to the follow-me type service through a combination of wireless and landline networks and does not provide service to general telephone network subscribers who happen to also subscribe to voice mail. Also, the Yue et al. system must have access to a separate reverse white pages directory, rather than utilizing the full available network information, such as used in a Caller ID Deluxe type name and number service.

Hence, there is an ongoing need for a technique to provide essentially the same data as caller ID to a voice mail system, to allow replay thereof during voice mailbox access by a subscriber. The necessary information should include name and telephone number of the calling party line or station. Also, there is a need for such information to be provided to the voice mail system on a consistent basis, where ever and when ever the network possesses the desired calling party information, whether or not the call originated at a station participating in the same voice mail service.

SUMMARY OF THE INVENTION

The inventive concepts alleviate the above noted problems with voice mail technology and address the stated need with regard to providing calling party information. The invention actually encompasses a number of techniques for supplying name and number information to a voice mail system from a telephone network, while processing of a forwarded call originally intended for a voice mail subscriber. In this manner, the voice mail system can stored the name and number type caller ID information in association with the subscriber's voice mailbox. The system may store this information even if the caller does not actually deposit a voice mail message. Later, while the subscriber reviews the contents of his or her mailbox, the system offers one of several options for verbal announcement of the name and number information derived during the forwarded call.

Hence, one aspect of the invention relates to a method of providing voice mail service with automatic caller identification through a telephone network comprising a traffic network with a plurality of central office switching systems and an interoffice signaling network. The method involves detecting a need to forward a call intended for a voice mail subscriber to a voice mail system that provides a mailbox for the subscriber, identifying a telephone number associated with a calling station, and obtaining name information corresponding to the telephone number. Preferably, the name information is obtained from a line identification database, for example via the interoffice signaling network, although the invention encompasses several different techniques for obtaining the data from that database or a similar database.

In the inventive methodology, the network forwards the call to the voice mail system. The voice mail system receives the telephone number and the name information from the network and records the name and number in association with the voice mailbox of the subscriber. The stored telephone number and name information are converted to an audible announcement,.and the voice mail system transmits that announcement through the telephone network to the subscriber, during a review of contents of the voice mailbox by the subscriber.

Other aspects of the invention relate to specific networks and network components for implementing the inventive voice mail service with enhanced caller ID functions. Several different network embodiments are disclosed, some of which present additional unique features.

For example, in one embodiment, the switch detecting the need to forward the call obtains the name information from the network database, e.g. to provide that information in a caller ID transmission to the subscriber's terminal equipment. However, when the call is forwarded to voice mail, the switch has retained the caller ID information including the name data, and the switch forwards that same data to the voice mail system with the forwarded call.

In an alternate embodiment, the voice mail system itself has interoffice signaling capability and preferably the ability to recognize triggers to initiate query procedures. In response to the forwarded call, for example, the voice mail system itself may launch the query to obtain the name information. The query may go to the line identification database. Alternatively, an intelligent implementation of a signaling transfer point may provide the desired data about the name associated with the calling party telephone number.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PREFERRED EMBODIMENTS

The various aspects of the invention disclosed herein relate to techniques for providing full caller identification data, typically name and number, for recording in a voice mail system with a forwarded call. The general intent is to provide substantially the same caller ID information to the subscriber's voice mailbox as the subscriber would receive if the network delivered the call to the subscriber's normal line, and the subscriber had a name-and-number type caller ID service. The voice.mail system provides an audible read-out of the caller ID information.

Reference now is made in detail to the presently preferred embodiments of the invention, examples of which are illustrated in the accompanying drawings and discussed below.

Figure 1:
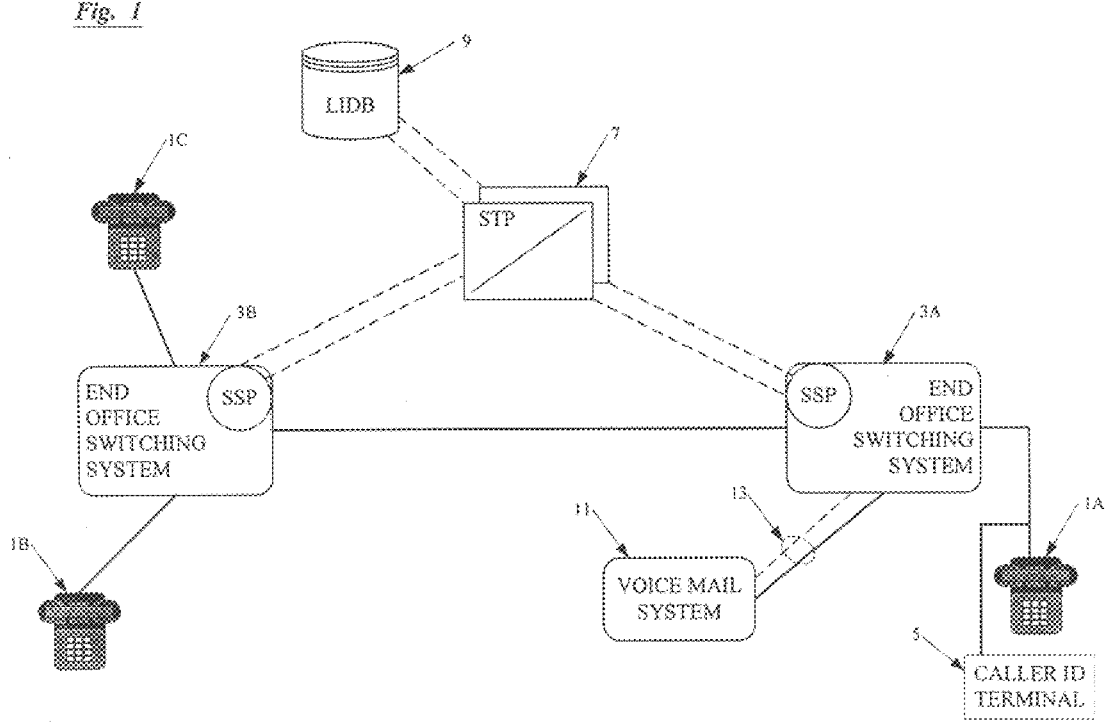
FIG. 1 is a functional block diagram of a public switched telephone network adapted to provide caller ID information along with voice mail messaging services, in accord with a first embodiment of the present invention.

The network shown in FIG. 1 provides switched telephone services to subscriber stations 1, three of which (1A, 1B and 1C) appear in the drawing for discussion purposes. The network includes a number of central office switching systems interconnected by trunk circuits. Some of the switches may serve as tandems (not shown). Many of the central office switches connect via subscriber links to the customers' station equipment 1, and as such, those offices are considered to be end office switching systems 3. For convenience of discussion, the drawing shows only two end office switching systems 3A and 3B of the many tandem and end office systems that typically make up a local exchange carrier's network.

FIG. 1 shows connections from the end office switching systems 3 to the subscriber stations 1 via lines, and typically these links are telephone lines (e.g. POTS or ISDN). It will be apparent to those skilled in the art, however, that these links may be other types of communication links, such as wireless links or various voice over Internet Protocol (IP) links.

At least some of the stations has caller ID capability. Most network implementations provide the caller ID service, for example, whether the call originates at a landline telephone station 1B or at a wireless station (not shown). The service also is available to both landline and wireless destination stations 1A. For discussion purposes, attention will focus on landline network links.

If the line to the destination is an ISDN (integrated services digital network) line, the station 1A may incorporate a display for visually presenting the caller ID information and other signaling related messages. If the link to the called station 1A is a typical analog telephone line, the customer premises equipment includes a caller ID terminal, one example of which is shown at 5. The terminal 5 receives and decodes FSK data signals and displays the caller ID information, including at least telephone numbers and preferably including alphanumeric information to enable displays of callers' names.

Much of the processing in accord with the invention relates to storage and retrieval of voice mail messages. Hence, for discussion purposes, the subscriber stations 1 preferably include two-way voice communication elements, such as found in telephones. However, the terminal devices or stations 1 can comprise any communication device compatible with the local communication link. Where the link is a standard voice grade telephone line, for example, the terminals could include facsimile devices, modems, etc.

The lines and trunks through the central offices 3 carry the communication traffic of the telephone network. The preferred telephone network, however, also includes a signaling network or portion which is separate from the traffic portion of the network. The signaling network transports a variety of signaling messages, principally relating to control of processing of calls through the traffic portion of the network. In a typical carrier-grade switched telephone network, the signaling network may be a common channel signaling (CCS) network or a common channel interoffice signaling (CCIS) network. For purposes of the discussion here, the CCS and CCIS versions of the interoffice signaling network are substantially the same, and the terms CCS and CCIS are used interchangeably.

An interoffice signaling network includes packet data links (shown as dotted lines) connected between appropriately equipped central office switching systems, such as offices 3, and a plurality of packet switches, termed Signaling Transfer Points (STPs) 7. To provide redundancy and thus a high degree of reliability, the STPs 7 typically are implemented as mated pairs of STPs 7. The interoffice signaling network of the telephone system operates in accord with an accepted signaling protocol standard, preferably Signaling System 7 (SS7).

In the embodiment shown in FIG. 1, each central office 3 has at least minimal SS7 signaling capability, which is conventionally referred to as a signaling point (SP) in reference to the SS7 network. As such, the offices can exchanges messages relating to call set-up and tear-down, typically in ISDN-UP format (ISDN users part, of SS7). At least end office switching systems 3A connected to voice mail systems 11, and preferably all, of the central office switching systems 3 have full service switching point (SSP) capabilities built therein.

The SSP switches are programmed to recognize identified events or points in call (PICs) as advanced intelligent network (AIN) type service triggers. In response to a PIC or trigger, an SSP-type central office switch 3 initiates a query through the signaling network to a control node such as a Service Control Point (SCP), or for purposes of this discussion to a database system, such as a Line Identification Database (LIDB) 9. An SCP (not shown) provides instructions relating to intelligent network type services. The LIDB 9 provides subscriber account related information, for calling card billing services. For purposes of the inventive services, it should be noted that the LIDB 9 also provides subscriber name information, for caller ID display and in preferred embodiments for the name delivery with the voice mail messages, based on communications through the signaling network with various SSP type nodes.

The LIDB database 9 typically includes current information regarding telephone numbers and corresponding listings for the local exchange carrier (LEC). However, virtually all of the local telephone companies participate in an interconnection of their line identification database systems to form a unified distributed implementation thereof covering the U.S.A. and Canadian. One instance of the distributed LIDB that does not have the requisite data can communicate with another instance, to obtain the data and supply data to a node that requested the information regarding the particular calling party number. As such, the LIDB 9 represents virtually all telephone numbers in the U.S.A. and Canada and can provide requested data in relation to any telephone number recorded in that database.

The central office switches 3 typically consist of programmable digital switches with CCS or CCIS communications capabilities. One example of such a switch is a 5ESS type switch manufactured by Lucent Technologies; but other vendors, such as Nortel and Seimens, manufacture comparable digital switches that could serve as SPs and/or as the SSP switches 3. The SSP type implementation of such a switch differs from the SP type implementation of such a switch in that the SSP switch includes additional software to recognize the full set of AIN triggers and launch appropriate queries.

The illustrated network offers normal switched telephone services and a variety of value-added services to the subscribers at stations 1. Of particular note here, the network also offers voice mail services and caller ID services.

To provide a voice mail service to subscriber stations 1A served through the end office 3A, the network includes a voice mail system 11 connected through a set of links 13 to the switch 3A. The links 13 carry voice calls as well as related signaling information. Although only one such connection is shown, a voice mail system 11 may have similar connections 13 to other ones of the end office switching systems 3. Similarly, a single end office switching system 3 may connect to several voice mail systems 11, for example, systems operated by different voice mail service providers.

Figure 2:
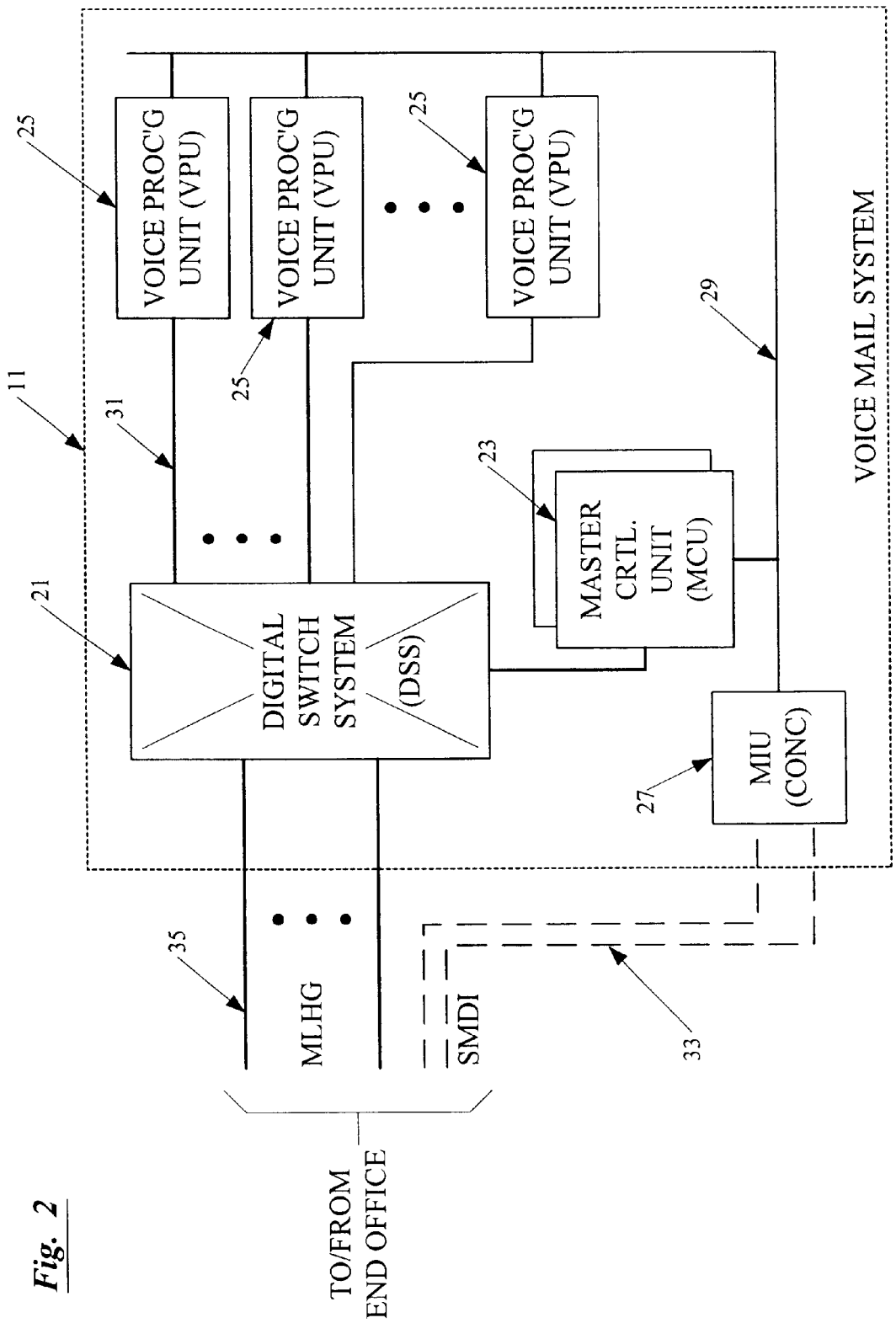
FIG. 2 is a functional block diagram of the voice mail system in the network of FIG. 1.

The centralized message service or voice mail system 11 in the illustrated example comprises voice messaging equipment such as shown by way of example in FIG. 2. Although referred to as "voice" messaging or voice mail equipment, the system 11 may have the capability of storing messages of a variety of different types as well as voice messages. For example, a single system 11 may receive incoming messages in the form of audible messages, such as voice messages, as well as text format data messages. The voice messaging equipment 11 may also store messages in an image data format, such as facsimile. Message service systems having the capability to store messages in a variety of audible, data and image formats are known, see e.g. U.S. Pat. No. 5,193,110 to Jones et al. Although the discussion that follows emphasizes caller ID in relation to voice messages, those skilled in the art will recognize the applicability of the inventive concepts to other types of messaging systems and particularly to unified messaging systems that process voice messages as well as other types of messages for their subscribers' unified mailboxes.

The embodiment of the voice mail system 11, illustrated in FIG. 2, includes: a digital switching system (DSS) 21, a master control unit (MCU) 23, a number of voice processing units (VPUs) 25 and a master interface unit (MIU) or concentrator 27. The master control unit (MCU) 23 of the voice mail system 11 is a computer device programmed to control overall operations of the system 11.

Each of the voice processing units 25 also is a computer device having a programmed processor, various memories, telephone network communication cards, and a local area network communication card. The voice processing units 25 each include or connect to one or more digital mass storage type memory units (not separately shown) in which the actual messages are stored in compressed digital form. The mass storage units, for example, may comprise magnetic disc type memory devices. Although not specifically illustrated in the drawing, the voice processing units 25 also include appropriate circuitry (e.g. network interface cards) to transmit and receive audio signals via T1 type digital audio lines 31.

To adapt the system 11 to receive information other than voice and/or offer services other than voice mail, one or more of VPU's 25 might be reprogrammed to run other types of applications and/or process other types of incoming information instead of or in addition to the programmed processing of voice messages. For example, one such unit might process facsimile information, one might process E-mail, etc. or each unit might process several different types of messages. An alternate embodiment of the voice mail system might incorporate the functions of the MCU and the voice processing unit into one computer, in which case, a single CPU would control programmed operations to perform the voice processing and system control functions.

In the illustrated embodiment, an ETHERNET type digital local area network 29 carries various data communications among the MCU 23 and the voice processing units 25. The Ethernet network 29 also carries stored messages, in digital data form, between the various voice processing units 25. The system 11 further includes T1 type digitized audio links 31 between the DSS switch 21 and each of the voice processing units 25.

In this embodiment, the voice mail system 11 connects to the switching system 3 via one or more simplified message desk interface (SMDI) type data lines 33, for certain two-way signaling functions. Specifically, these SMDI links 33 connect between one or more data units (not shown) in the end office switching system 3A (FIG. 1) and the MIU 27 in the system 11. Each SMDI link 33 carries 2400 baud RS-232 data signals in both directions between the voice mail system 11 and the switching system 3A. The MIU 27 is a data concentrator, which effectively provides a single connection of as many as thirty-two SNMDI lines into the MCU 23 of the voice mail system 11. Alternative data links may be used, such as an F-link type dedicated SS7 signaling connection between the voice mail system 11 and the switch 3A, or if the voice calls utilize a primary rate interface (PRI) type ISDN connection, the signaling may utilize the data (D) channel of the PRI.

The voice mail system 11 also connects to the end office switching system 3A via a number of voice lines 35 which form a multi-line hunt group (MLHG) between the switch matrix within the switching system 3 and the DSS switch 21 of the voice mail system 11. Typically, the MLHG lines 35 consist of a number of T1 type trunk circuits, each of which carries 24 voice channels in digital time division multiplexed format, although as noted, the communications to/from the switch may use a PRI type ISDN connection.

In various operations discussed in more detail below, calls can be forwarded to the voice mail system 11 in response to calls to subscribers' telephone numbers. Alternatively, the switching system 3A can route calls directly to the voice mail system 11 in response to callers dialing a telephone access number assigned as the lead hunt group number for the lines 35 going to the voice mail system 11. When the end office switching system 3A directs a call to the voice mail system 11, whether as a forwarded call or as a direct call in response to dialing of the access number, the switching system 3A places the call on any available channel on the multi-line hunt group lines 35. The switching system 10 also provides various data relating to the call via one of the SMDI links 33 and the MIU 27 to the MCU control unit 23.

For example, for a call forwarded to a mailbox, the data on the SMDI link 33 from the exchange indicates the reason for the forwarding, and the caller telephone number (typically the directory number assigned to the called subscriber's normal telephone line), which identifies the subscriber and hence the mailbox that the forwarded call relates to. The master control unit 23 uses the multi-line hunt group line information and the subscriber's directory number to internally route the forwarded call though switch 21 and one of the internal T1 links 31 to an available voice processing unit 25 and identifies the relevant subscriber to that voice processing unit via the Ethernet 29.

The mailbox of a subscriber is a logical construct formed by storing various files within the system 11 so as to be associated with the subscriber or the mailbox. For each party who subscribes to the voice mail service provided by the voice mail system 11, the MCU 23 stores information designating one of the voice processing units 25 as the "home" unit for that subscriber. Each voice processing unit 25 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit 25. Stored messages for the subscriber, although identified with the mailbox, may physically reside in storage in or associated with any of the voice processing units 25.

Each time a call comes in to the voice mail system 11, the master control unit 23 controls the digital switching system 21 to provide a multiplexed voice channel connection through to one of the voice processing units 25. Typically, a forwarded call connection, for example, goes to the "home" voice processing unit 25 for the relevant subscriber. The subscriber and the associated mailbox are identified by the data transmitted from the switching system 11, as described above, if the call is a forwarded call. Alternatively, the subscriber is identified by data transmitted by the subscriber when the subscriber calls in to access the subscriber's mailbox to retrieve stored messages or to activate other services provided by the voice mail system. If all 24 T1 channels to the "home" voice processing unit are engaged, the central processing unit 23 controls switch 21 to route the call to another voice processing unit 25, which is currently available.

The voice processing unit 25 connected to the call retrieves prompt messages and/or previously stored messages from its memory and transmits them back to the calling party via the internal T1 line 28, the DSS switch 21 one of the MLHG lines 35, one or more of the switching systems 3 and the calling party's telephone line. The voice processing unit 25 connected to the call receives incoming messages from the caller through a similar route and stores those messages in digital form in its associated mass storage device.

The above described voice mail system architecture is similar to existing voice mail type central messaging systems, such as disclosed in U.S. Pat. No. 5,029,199 to Jones et al., although other messaging system architectures could be used. Also, it will be recognized by persons of ordinary skill that the combinations of T1s with SMDI links or F-links between the end office switching system 3A and the voice mail system 11 can be replaced by an appropriate number of primary rate interface (PRI) links, each of which comprises 23 bearer (B) channels and 1 data (D) channel for signaling.

On forwarded calls, the caller responds to a prompt from the subscriber mailbox by speaking a message, which the voice processing unit 25 stores as a file associated with the subscriber's voice mailbox. The voice processing unit 25 also stores the relevant data regarding the message, such as time/date of receipt and any calling party information (typically name and number). The subscriber later accesses his or her voice mailbox to listen to information about stored messages and/or selectively listen to the messages themselves. Stored text messages, e.g. messages received as fax or e-mail messages, can be converted to speech and played back to the subscriber in a similar fashion. In accord with the invention, the data associated with each message includes the full caller ID information, preferably including name and number for each forwarded call.

The subscriber may listen to a menu of options, or if the subscriber is familiar with the options, the subscriber may proceed directly to a desired option by pressing the appropriate button on the telephone keypad. For example, when the system is announcing that it has a particular message for replay, the subscriber may input "6" via the keypad, and the system will respond by announcing the calling party number and preferably the associated name information.

Consider now the processing of a call from station 1B directed to the subscriber's station 1A. In the example, the customer at station 1A subscribes to name-and-number type caller ID as well as to the enhanced voice mail service. With reference to FIG. 1, at the start of such a call, the originating end office switching system 3B provides dial tone or the like over the line to the station 1B, and the caller dials digits corresponding to the desired destination, typically the number associated with station 1B. The end office switching system 3B executes its normal processing to route the call through the network. Specifically, the end office switching system 3B uses the dialed number to initiate an interoffice signaling communication with the exchange serving the intended destination, in the example the terminating central office switching system 3A.

The end office switching system 3B generates an Initial Address Message (IAM) for transmission to the terminating central office 3A. The IAM message includes the SS7destination point code (DPC) of the terminating central office 3A and the SS7 origination point code (OPC) of the customer's serving-end central office 3B, for addressing purposes. The payload portion of the IAM message includes the called and calling numbers. The originating end office switching system 3B transmits the IAM message through the STP pair 7 and other elements of the interoffice signaling network as needed to reach the distant terminating end office switching system 3A.

When the terminating end office switching system 3A receives the IAM message, the administrative module processor for that office retrieves the customer profile for the number in the destination number field of that message (e.g. the number for the telephone 1A) from its mass storage system and loads that profile into one of its call store registers. If the called party has an enhanced caller ID service, with name display as in our example, the terminating central office 1A recognizes the attempt to complete a call to that party's number as a terminating attempt trigger (TAT) type point in call (PIC). This recognition serves to trigger the end office switching system 3A to access the LIDB database 9 for name information.

The SSP capable switch 3A knows the SS7 call set-up signaling session, for the incoming call in progress, for example, from an identifier in the original IAM message received from end office switching system 3B. The offices and any other involved nodes use that identifier in all subsequent messages regarding the call to coordinate processing and signaling relating to the call. The end office switching 3A knows the calling party telephone number from the signaling received from the originating end office switching system 3B via one of the STPs 7; and the terminating end office switching 3A coordinates that number with the call based on the session number, for example, by temporarily storing the number with other relevant information about the call in the assigned one of its internal call store registers.

In response to the TAT type PIC, the terminating end office switching system 3A launches a second query message through one or more of the STP(s) 7 to the LIDB database 9. This query is formatted in accord with the Transactional Capabilities Application Part (TCAP) of SS7. The TCAP query message includes the telephone number associated with the calling station 1B as well as the session identifier. The LIDB database 9 uses the calling party telephone number, to retrieve the subscriber's account file record associated with the calling number from the database.

The query also indicates the cause of the query, i.e. the TAT triggering event. From this information, the LIDB database 9 recognizes that the query is a request for name information. The database 9 therefore reads up to 15 characters of name data from the calling subscriber's account file. The LIDB database 9 compiles a TCAP call control message, including the name data and the session identifier. The LIDB database 9 returns that call control message to the terminating end office switching system 3A via the SS7 network.

The terminating central office switching system 3A receives the call control message from the LIDB database 21, and the switch associates the information from that message with the particular call based on the session.identifier. To provide the caller ID service to the called party station 1A under normal circumstances, the terminating end office switching system 3A combines the name data from the call control message together with the calling party number as two caller ID messages. The end office switching system 3A then signals the originating office 1B and initiates ringing of the called party's line.

As part of the transmission over the line to the station 1A, the end office switching system 3A sends the two caller ID messages as FSK data signals, between the first and second ring pulses. The caller ID terminal 5 receives and demodulates the two caller ID messages, to recover the calling party name and telephone number information. Alternatively, if the user subscribes to ISDN service, the end office switching system 3A sends the name and number data over the D-channel to an ISDN user device associated with or incorporated into the subscriber station 1A. The terminal 5 (or other device) displays the received data and stores the data in memory for further use.

To this point, the call processing example has provided name and number type caller ID service, in essentially the same manner as in existing networks supporting a name and number type service, such as Caller ID Deluxe. However, now consider the network operation when the call is re-directed to the voice mail system 11. In such a situation, the call processing begins as outlined above with the call from station 1B to the number for station 1A, until processing in the terminating central office switch 3A involves an attempt to complete the call to the station 1A. At this point, the switch 1A detects a need to transfer or forward the call to voice mail, due to a busy condition, because the called station 1A did not answer within a set number of rings, or because the subscriber has activated a 'forward all calls' to voice mail feature.

When the end office switching system 3A directs the call to the voice mail system 11, the switching system places the call on any available channel on the multi-line hunt group lines 35 (FIG. 2). The switching system 3A will also provide various data relating to the call via one of the SMDI links 33 and the MIU 27. As with prior voice mail technology, this data identifies the called telephone number and the telephone number of the caller, the line in the hunt group that will carry the call and the reason for routing to voice mail (forwarded call originally intended for subscriber line, in this example).

When a call originally intended for a subscriber number is forwarded or redirected to voice mail, the switch normally has not saved the caller ID stream of data, and that data is not available to send with the call to the voice mail system. The switch 3A could query the LIDB database 9 for the name, for example, upon detection of a name-and-number caller ID service provisioned in the subscriber profile for the link 13 to the voice mail system 11. However, that query would essentially duplicate the earlier operations used to generated the Caller ID Deluxe data for transmission over the subscriber line. It is preferred that in this embodiment the switch 3A retain the name and number information with the other session information about the call and use that same data a second time, to forward the full caller ID data to the voice mail system 11 with the forwarded call.

The services provided by the end office switching system 3A to the subscriber station 1A are defined and controlled by a subscriber profile stored in the switch 3A in logical association with the line to the station 1A and the corresponding assigned telephone number. For example, it is that subscriber profile that indicates that the party at station 1A subscribes to Caller ID Deluxe and thus activates the trigger for signaling the LIDB 9 to obtain the caller's name information. In preferred operation of the embodiment of FIGS. 1 and 2, the SSP switch 3A also recognizes from the subscriber.profile that when it forwards a call for the station 1A over to voice mail system 11, the switch 3A is to retain the complete set of caller ID information, including both name and number of the caller in our example.

In accord with the invention, the switch sends the full caller ID data to the voice mailbox within the system 11, when it forwards the call to the voice mail system 11. An appropriate one of the voice processing units 25 recognizes the ASCII data for the caller ID and stores that data for the call in the subscriber's voice mailbox. The caller ID information is stored in the mailbox regardless of the presence, absence or length of any incoming message subsequently received from the caller and recorded in the mailbox. Typically, the voice processing system records the time and date of the call. Assuming the caller leaves an audible voice message, the voice processing unit 25 stores the caller ID data in association with the audio file for the voice message, for readout when the subscriber later accesses the mailbox to review messages.

This embodiment of the invention admits of several different ways to transmit the full caller ID information to the voice mailbox. For example, the carrier could provision the multi-line hunt group 35 to carry Caller ID Deluxe information. In such a case, the switch 3A transmits the caller ID data between the first and second ringing signals, as on the plain old telephone service (POTS) type subscriber line, albeit in digitized format. However, since the switch 3A retained this data from its initial attempt to complete the call to the station 1A, in the preferred operation, the switch need not repeat its query to the LIDB 9 to obtain the name. The voice processing unit 25 servicing the forwarded call would wait until after the interval expires to answer the call, so as to receive the caller ID data messages. The voice processing unit 25 would receive and process the data to recover the caller's number and the associated name, as part of its initial processing before actually playing announcements to and receiving speech from the caller.

In the system of FIGS. 1 and 2, it is preferred that the programming of the switch 3A and the voice mail system 11 with respect to the SMDI link and its associated protocol have been modified to add the desired caller ID information to the SMDI transmission to the MIU 27. Specifically, rather than simply sending the caller's telephone number data, the switch 3A sends the full available caller ID information over the SMDI link with the other data regarding the forwarded call. In this example, that means that the switch 3A transmits the name and number information in the data stream over the SMDI link through the MIU 27 to the MCU control unit 23. The MCU control unit 23 in turn forwards that data to one of the voice processing units 25 over the Ethernet 29, when it assigns that voice processing unit 25 to handle the particular call. The voice processing unit 25 stores that data in a file associated with the subscriber's voice mailbox, which the unit identifies from the called party number included in SMDI data stream.

The connected voice processing unit 25 provides an answering prompt message to the caller, typically including a personalized message recorded by the called subscriber. After the prompt, the voice processing unit 25 records an audible message, if any is received from the caller, and the unit identifies that stored message as one for the subscriber's mailbox.

In each of the above-discussed operations of the embodiment of FIGS. 1 and 2, the system 11 stores the caller ID telephone number and whenever available the name, for all calls forwarded for a called subscriber who has a name and number type caller ID service, such as Caller ID Deluxe. Hence, the subscriber's mailbox will contain this information for all forwarded calls, for presentation when the subscriber later calls-in to the voice mail system 11 to review messages stored in his/her mailbox. It may be helpful at this point to consider the call processing involved in accessing and reviewing messages, including the attendant caller ID data.

To retrieve messages, the subscriber calls in to the voice mail system 11. The caller may dial the access number from home, e.g. using station 1A, or from a remote location such as station 1C. From the home telephone 1A, this would often involve some form of one-touch speed dialing. The telephone network routes the call in the normal manner and the serving end office switching system 3A, which connects the call to the voice mail system 11, as if the system itself were an end-use subscriber station. At the same time, the switch 3A provides called and calling number information and an indication that this was a direct call, to the MCU control unit 23 via the SMDI link 33 and the MIU 27. The MCU 23 recognizes that the call came in as directly dialed access call and instructs the digital switch system 21 to connect the call to an available voice processing unit 25. If the calling number is that of the subscriber station 1A, the system may connect the call to the voice processing unit 25 normally assigned to serve as the 'home' unit for the subscriber's voice mailbox.

The connected voice processing unit 25 plays back a general message prompting the caller for a password or access code. If the call is from the subscriber's own line to station 1A, the identification data received over the SMDI link identifies the mailbox. If the call is from a different remote telephone 1C, the system prompts the subscriber for a mailbox number, typically before prompting for the password. If the password is correct for the particular subscriber's mailbox, the system 11 allows the caller access to the messages stored in the identified mailbox and to utilize related mailbox processing features. Any messages or data relating to the subscriber's mailbox that resides in storage associated with other voice processing units 25 may be transferred to the unit 25 servicing the access call, as needed, via the Ethernet 29.

Typically, the system 11 offers the validated subscriber a menu of options, one of which may relate to message review or retrieval. For example, the system may tell the subscriber that he or she has some number of new messages and offer him or her the option to record messages or play received messages. Typically, the user selects options by pressing appropriate keys on the telephone keypad, although enhanced implementations of the voice mail system 11 also provide speech recognition capabilities for receiving subscriber inputs such as the menu selections.

If the user selects the option to listen to received messages, the system 11 will provide an announcement of some data associated with each message and an option to play any stored audio information. In accord with an embodiment of the invention, the announcement of associated of data includes a synthesized speech announcement of the caller ID data, preferably including the name and number of each caller, along with the time that the system received the particular message or call and the length of any recorded message. In the message storage, the caller ID data appears as text data. The voice processing unit 25 runs a speech synthesis program to convert the text to digitized audio and transmits that audio through the telephone network for analog presentation to the caller via one of the stations 1. Upon hearing the caller ID data, the subscriber may skip the actual recorded speech message, or the subscriber may listen to the audio message recorded from the caller, typically by pressing appropriate keys on the telephone keypad.

Alternatively, while reviewing the messages in the mailbox, the subscriber may have the option to press one or more predetermined keys on the telephone keypad to request the caller ID data. For example, while listening to a recorded voice mail message from the caller, the subscriber may dial a '6.' In response, the voice mail system would provide the synthesized speech announcement of the caller ID data, preferably including the name and number of the line/station 1B used by the caller who left the particular voice mail message.

Figure 3:
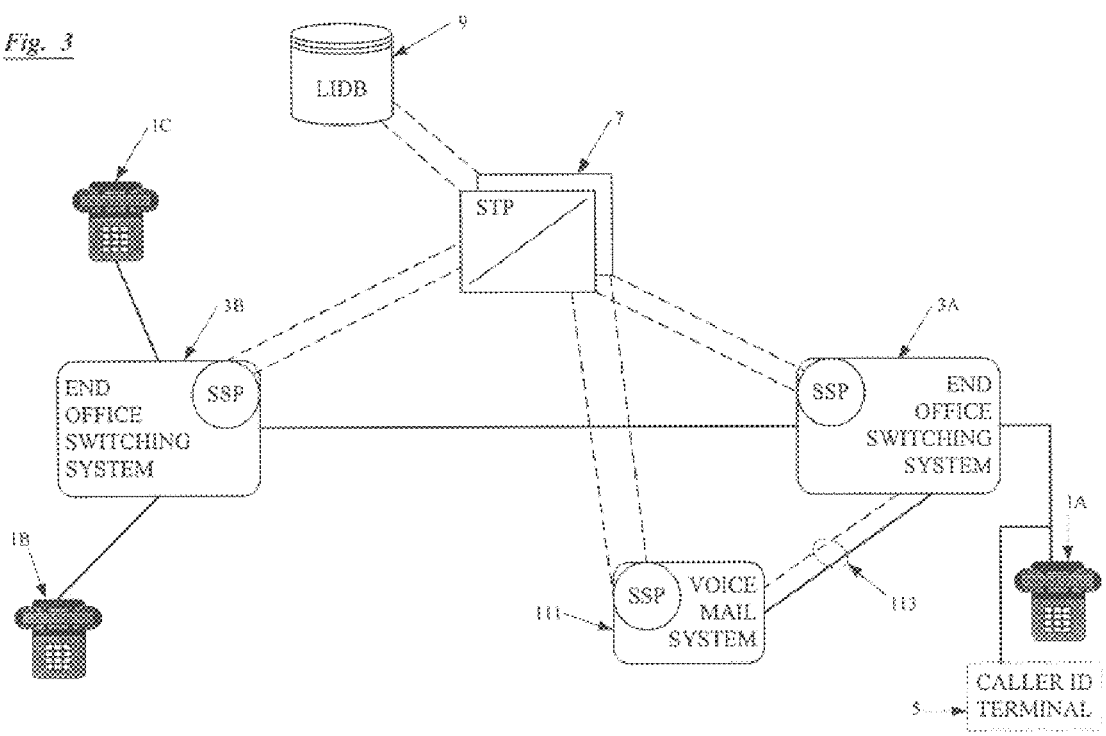
FIG. 3 is a functional block diagram of a public switched telephone network adapted to provide caller ID information along with voice mail messaging services, in accord with a second embodiment of the present invention that utilizes SSP capability in the voice mail system to obtain the caller name information.
Figure 4:
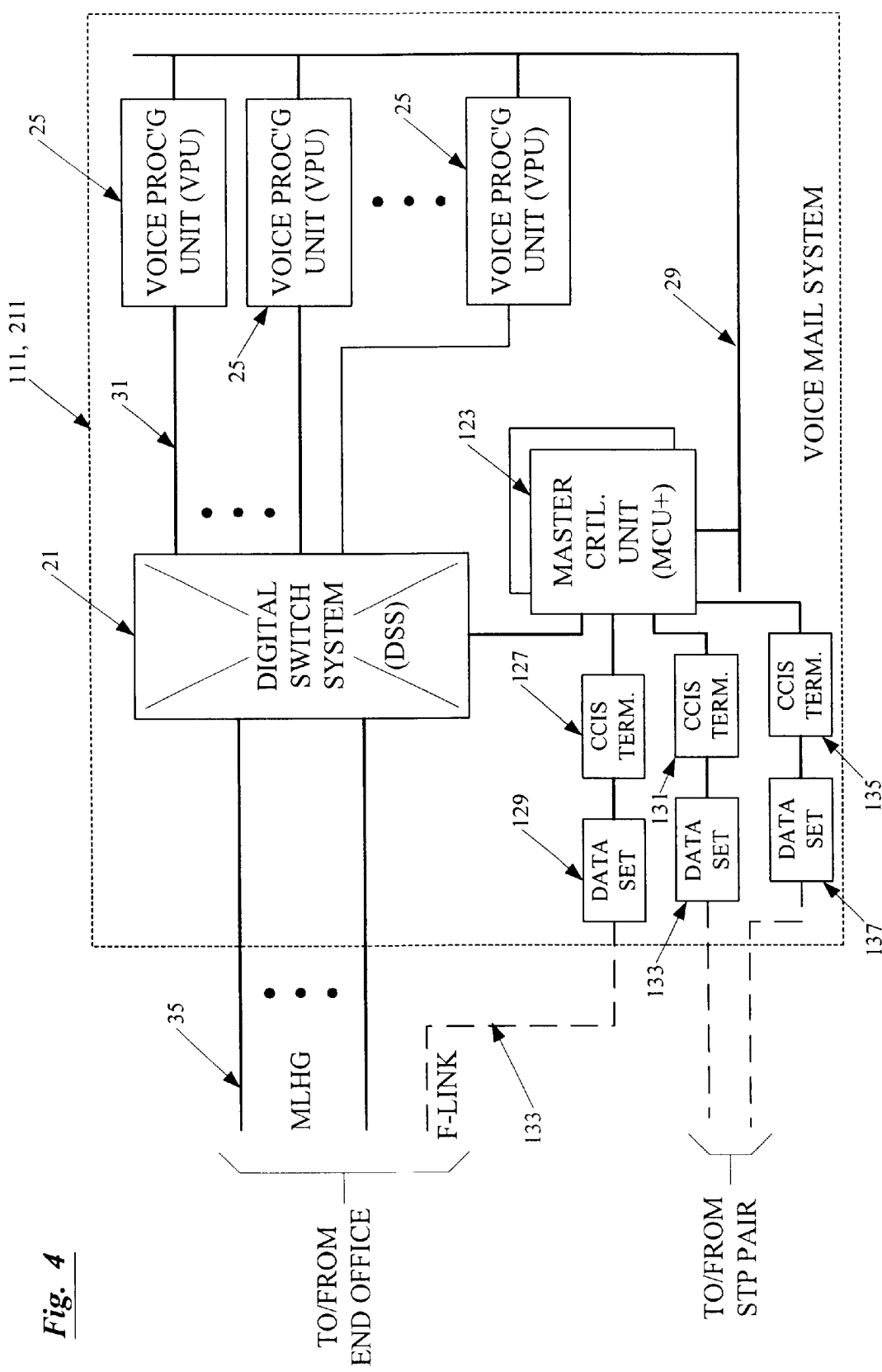
FIG. 4 is a functional block diagram of the voice mail system in the network of FIG. 3.

The present invention encompasses a number of other embodiments, including for example embodiments in which the voice mail system has SS7 signaling capability, as shown for example in FIGS. 3 and 4. The network shown in FIG. 3 is generally similar to that of FIG. 1, and like reference numerals have been used to designate similar elements. In this embodiment, however, the network includes a somewhat different implementation of the voice mail system shown at 111.

The system 111 connects to the end office 3A, but the link 113 is somewhat different. The link 113 includes voice lines forming the multi-line hunt group 35 of FIG. 3, but the signaling link is a type of SS7 signaling link instead of an SMDI link. In the second embodiment, the signaling to/from the end office switching system could go through the STP pair 7 but preferably utilizes a dedicated SS7 link, known as an F-link, between those two network nodes.

As shown in FIG. 3, the voice mail system 111 has SSP capabilities essentially the same as those of the end office switching systems 3. Like those switches, the voice mail system 111 has signaling links to the STP pair 7. Of particular note, the SSP capable voice mail system 111 can recognize certain call processing events as PICs or triggers and launch queries to obtain data or instructions via the signaling network. As discussed more later, this capability allows the voice mail system 111 to itself query the LIDB database 9 to obtain name information based on the calling party number.

FIG. 4 is a block diagram showing in detail the SS7-capable voice mail system (VMS) 111 of FIG. 3 according to the second embodiment of the present invention. The system 111 comprises a digital switch 21, internal lines 31, voice processing units 25, and an internal Ethernet type data network 29, similar to elements of the voice processing system 11 of FIG. 2. FIG. 4, however, shows the different elements used to provide the SS7 type signaling links, and the master control unit 123 has additional capabilities (MCU+) to utilize SS7 signaling and implement the desired SSP functions.

As noted, this embodiment utilizes an F-link type SS7 connection 133 between the voice mail system 111 and the end office switching system 3A. For communication over that link, the voice mail system 111 includes a CCIS terminal 127 and an associated data unit 129 that provides SS7 signaling for the master control unit 123 over the link 133. The CCIS terminal 127 and the data unit 129 enable the MCU+ controller 123 to send and receive data in various SS7 protocols, such as ISDN-UP and TCAP. There may be a plurality of F-link connections to one or more of the end office switching systems, as needed to support the volume of traffic to and from the voice mail system 111.

The voice mail system 111 also includes SS7 signaling interface components for communications over two A-links to/from the STPs 7 in the mated pair (see FIG. 3). Specifically, the system 111 includes a CCIs terminal 131 and an associated data unit 133 that provide SS7 signaling via a first A-link and a CCIS terminal 135 and an associated data unit 137 that provide SS7 signaling link via the other A-link. These elements coupled to the A-links allow the MCU+ control unit 123 to send and receive SS7 signaling messages to any other node coupled to the signaling network, for example via the various network STPs 7 (only two of which appear in FIG. 3). These A-links provide sufficient capacity to carry all necessary signaling to and from the particular voice mail system 111.

Of particular note, at this point, the A-links allow the voice mail system to send and receive TCAP query and response messages, to obtain instructions from an SCP or in the case of the inventive voice mail service to obtain caller ID information such as name data from a network database like the LIDB 9. The TCAP protocol provides standardized formats for various query and response messages. Each query and response includes data fields for a variety of different pieces of information relating to the current call. For example, an initial TCAP query from an SSP includes among other data a "Service Key," such as the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits. In accord with the invention, the MCU 123 is also capable of generating TCAP query messages, particularly to obtain name information from the LIDB 9, based on the calling party number.

In addition to the ability to send and receive data to/from the CCIS terminals and data sets, the MCU+ control unit 123 is programmed to perform necessary signaling in various parts of the SS7 protocol via those components, to support its normal voice mail operations and to conduct TCAP communications with the LIDB database 9, to obtain name information about callers. This programming includes appropriate trigger recognition software, to cause the MCU+ 123 to launch queries to the database at the correct time. The software essentially corresponds to the software used in the CPUs of the switching offices 3 to implement their SSP functionalities.

In the embodiment of FIGS. 3 and 4, the subscriber need not have caller ID service from the network. Hence, the caller ID terminal 5 appears in dotted-line form in FIG. 3. In such a case, the profile for the subscriber within the switch 3A need not include provisioning for Caller ID Deluxe or even any other type of caller ID service. If the subscriber subscribes to a caller ID feature of the voice mail, the system 111 will automatically obtain the necessary information from the LIDB database 9. The serving end office switch 3A need not obtain that information for either the subscriber or for the voice mail system.

In operation, the network will route calls for the subscriber station 3A as normal calls. If forwarding is not active, the line is not busy and someone answers the called party station 1A within the set number of rings, the network delivers the call to that station in the normal manner. If the subscriber does not have a name and number type caller ID service, like Caller ID Deluxe, the end office switch 3A delivers the call without accessing the database 9 and may not even deliver any type of caller ID information over the subscriber's line.

If the subscriber's line has a selective forwarding feature active or there is a reason to forward the call (busy or no answer), then the switch 3A forwards the call to the voice mail system 111. It may be helpful now to consider such an operation in the network of FIG. 3 and then explain the attendant operation of the voice mail system 111 in accord with the inventive aspects of this embodiment.

When the switch re-directs the call to the voice mail system 111, the switch routes the call to one of the lines within the multi-line hunt group 35. At the same time, the end office switching system 3A provides various data relating to the call via the F-link 133, the data set 129 and the CCIS terminal 127 to the MCU+ controller 123. This data identifies the assigned line or channel within the hunt group, the called telephone number, the telephone number of the caller, and the reason for routing to voice mail (forwarded call originally intended for subscriber line, in this example).

Within the voice mail system 111, the data unit 129 forwards the SS7 data packet to the CCIS terminal 127, which extracts the message data from the SS7 packet and forwards the message data to the MCU+ control unit 123. The unit 123 uses the multi-line hunt group line information and the subscriber's directory number to internally route the forwarded call though DSS switch 21 and one of the internal T1 links 31 to an available voice processing unit 25, preferably the subscriber's 'home' unit. The MCU+ control unit 123 provides data to identify the relevant subscriber to that voice processing unit 25 via the Ethernet 29. The voice processing unit will answer the call, prompt the caller and receive/store any incoming audio message from the caller in the subscriber's mailbox, in essentially the normal manner.

During this processing, because there is no name data in the signaling from the switch 3A, the MCU+ controller 123 recognizes a PIC or trigger. The MCU+ control unit 123 communicates with the LIDB database 9 to obtain the name. Specifically, the control unit 123 formulates an initial TCAP query message containing various information about the current call, including the calling party number received with the call via the F-link. The MCU+ control unit 123 forwards the query to one of the CCIS terminals 131 or 135, which formats the data into an SS7 packet. The CCIS terminal supplies the packet to the associated data set 133 or 137, which transmits the packet over the connected A-link to one of the STPs 7. The SS7 message includes an appropriate destination point code or global title translation code, such that the STP 7 processes the message and forwards it to the LIDB database 9.

The LIDB database 9 uses the calling party telephone number, to retrieve the account file record associated with the calling number from the database. The query also indicates the cause of the query. From this information, the LIDB database 9 recognizes that the query is a request for name information. The database 9 therefore reads up to 15 characters of name data from the calling number subscriber-account file. The LIDB database 9 compiles a TCAP call control message including the name data and returns that call control message to an STP 7 of the SS7 signaling network.

The TCAP call control message includes a destination point code associated with the voice mail system 111. Hence, the STPs 7 of the signaling network forward the TCAP call control message until it passes over an appropriate one of the A-links back to the voice mail system 111.

Within the system 111, this response message arrives at one of the data sets 133, 137. The data set forwards the SS7 data packet to the CCIS terminal 131 or 135, which extracts the message data from the SS7 packet and forwards the message data to the MCU+ control unit 123. In this instance, the MCU+ control unit 123 recognizes the response message as one containing requested name data. The unit 123 in turn forwards the name data to the voice processing unit 25 handling the forwarded call, via the Ethernet 29. The MCU+ control unit 123 also provides instructions/data to that voice processing unit 25 to cause the unit 25 to store the name data and the calling party telephone number in a call data file associated with the subscriber's voice mailbox and appropriately linked to any audio message deposited by the caller.

In this embodiment, the caller can review data about stored messages or other received calls and listen to any recorded audio messages in essentially the same manner as described above relative to operations of the embodiment of FIGS. 1 and 2. In particular, the second embodiment provides the same types of options to announce the full caller ID information (preferably name and number) to the subscriber, for all calls forwarded to the subscriber's mailbox.

The second embodiment also admits of a number of modifications within the spirit and scope of the invention. For example, the communications between the SSP capable voice mail system 111 and the LIDB database 9 utilized the general SS7 signaling network through the STPs. 7. An alternative approach would be to use some other data network connection. Although the alternative connection could utilize generic packet protocols and a separate data network, it most likely utilizes a dedicated SS7 connection in the form of another F-link, between the system 111 and the LIDB database 9.

Figure 5:
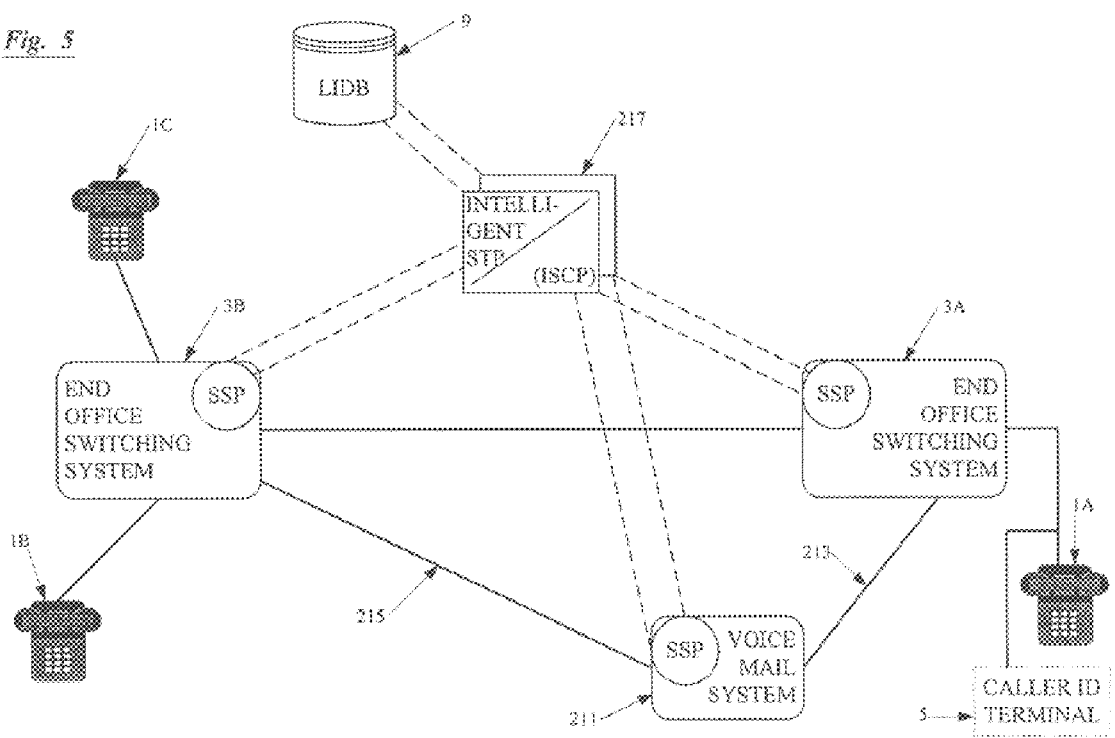
FIG. 5 is a functional block diagram of a public switched telephone network adapted to provide caller ID information along with voice mail messaging services, in accord with a third embodiment of the present invention that utilizes an intelligent signaling transfer point (ISTP).

The embodiment of FIG. 5 is generally similar to that of FIG. 3, except that there is no direct signaling link between the end office switching system 3A and the voice mail system 211. Also, in this implementation the switch 3A connects to the voice mail system 211 through a multi-line hunt group 213, and the end office switching system 3B connects to the voice mail system 211 through a similar multi-line hunt group 215. In this embodiment, all of the signaling to and from the voice mail system 211 goes through the regular interoffice signaling network, including one or more STPs. In accord with the invention, however, the STPs have been upgraded with intelligent capabilities to function as intelligent STPs or ISTPs 217, in accord with U.S. Pat. No. 5,586,177 to Farris et al. The ISTPs 217 typically are implemented in pairs, similar to the STPs 7. For purposes of some intelligent processing, it is necessary for the two ISTPs to maintain a unified database of call processing records and to synchronize session-related data held in each ISTP during processing of each call.

The structure of the voice mail system 211 is shown in of FIG. 4, except that the CCIS terminal 127 and the data set 129 that provide the coupling to the F-link 133 would be eliminated. The signaling that previously used the F-link 133 now goes via the A-links and the CCIS terminals and data sets coupled thereto.

Figure 6:
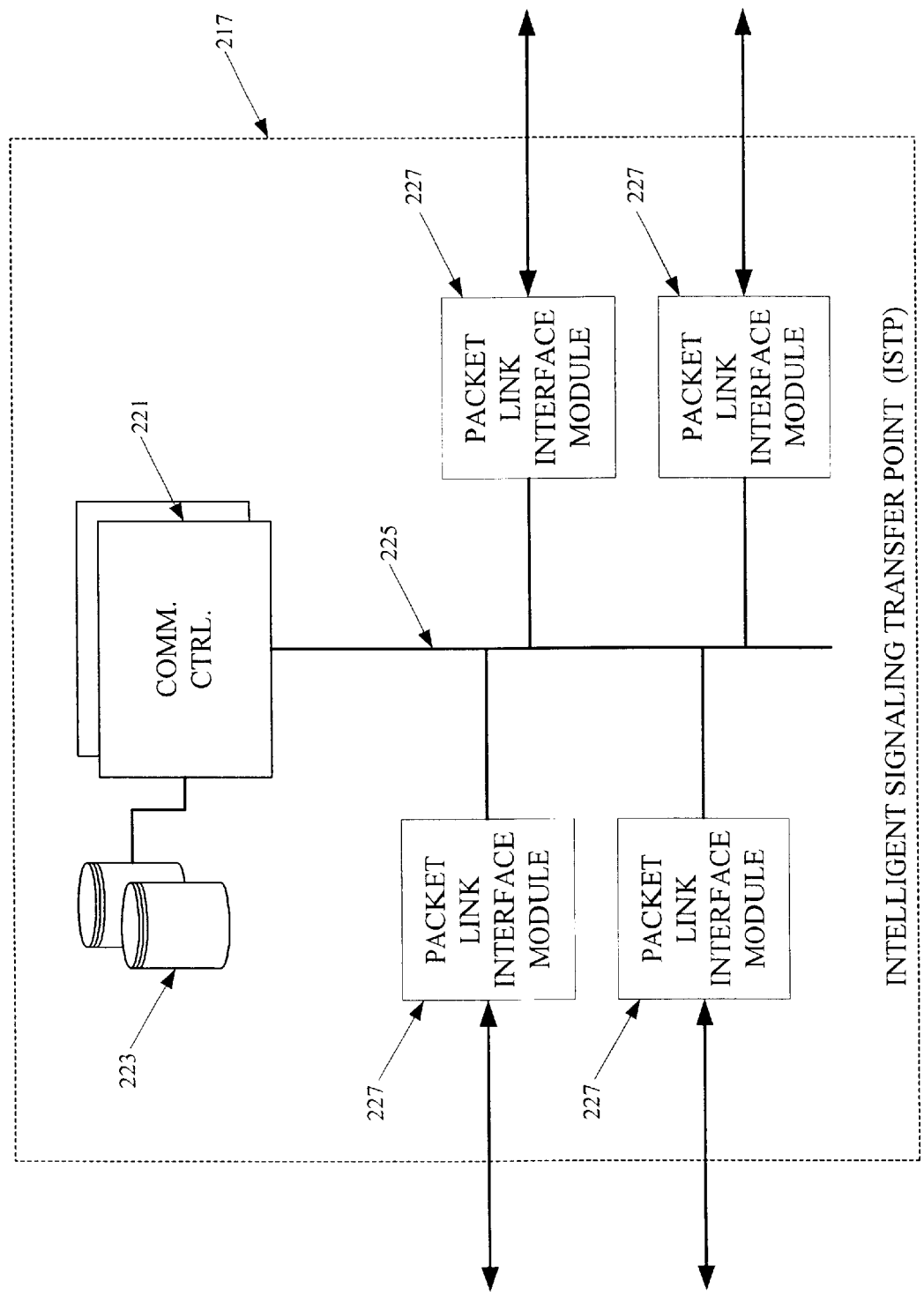
FIG. 6 is a functional block diagram of the ISTP used in the network of FIG. 5

The call processing for the third embodiment could be identical to that in the embodiment of FIGS. 3 and 4, except that the signaling between the switch 3A and the voice mail system 211 goes through one or more STPs. However, an alternate processing technique is preferred for this embodiment, and the alternate embodiment takes advantage of the intelligence of the ISTP 217 in order to achieve efficient delivery of the desired name and number information to the voice mail system 211. We will discuss this call processing, in a moment but it may be helpful first to consider the structure of an exemplary ISTP 217, as shown in FIG. 6.

For its normal STP switching functions, the ISTP 217 is essentially a packet switch that receives signals from other network elements, multiplexes and switches the signals appropriately, and then transmits the signals to other network elements. The ISTP 217 functions as both a static and dynamic routing database that controls access to, and directs call signaling between, a variety of nodes and networks coupled to the signaling network.

The ISTP 217 has a communications controller or central processor 221, which typically is a circuit card or module containing necessary electronics for controlling operation of ISTP 20 by executing software instructions. Communications controller 221 may be a single microprocessor or microcontroller, a group of microprocessors or microcontrollers, or a plurality of electronic modules depending on the complexity of the ISTP 217. In addition to the microprocessor(s), the communications controller 221 includes RAM and a program store and possibly other memory devices. In an intelligent embodiment of an STP, the communications controller 221 incorporates or communicates with a mass storage containing a database of control information, shown as the separate database 223 for convenience of illustration and discussion. The communications controller 221 and the database 223 preferably are implemented as redundant systems, for network reliability and load handling purposes.

The database 223 stores call processing records (CPRs). Although any convenient database software may be used, in one embodiment, the database 223 is a Multi-Services Application Platform (MSAP) database similar to those used in existing ISCPs (Integrated Services Control Points). The CPRs are customized to offer an array of intelligent services. At least some CPRs are adapted to provide call processing control in relation to the inventive voice mail caller ID service, as discussed more, later.

The communications controller 221 interfaces with other elements within the ISTP 217 via a data bus 225. In addition, ISTP 217 includes a number of packet link interface modules 227, only four of which are shown for convenience. The interface modules 227 are preferably circuit cards or the like, which contain electronics for providing two-way coupling of SS7 data packets to and from the actual data links providing the transport between the ISTP 217 and the connected nodes. These electronics also include addressable interfaces to the data bus 225 to enable transport of packets between the interface modules 227 and/or between the modules 227 and the communications controller 221. Each interface module 227 within STP 20 contains an internal microprocessor or microcontroller. Interface units 227 also contain affiliated memory for storing software routines for execution by the internal microprocessor or microcontroller and for storage of necessary data for the respective interface module. The internally addressed communication across the data bus 225 provides a logical switching environment or fabric, essentially so that packets received via one link may be processed and retransmitted out over another link.

The communications controller 221 provides control instructions to and receives status information from the microprocessors within the interface modules 227 via the data bus 225, for example to control the logical packet switching of SS7 messages between the modules across the bus 225. For certain intelligent processing services, the communications controller 221 also transmits and receives some messages via the bus 225 and the interface modules 227, for example, to send and receive certain TCAP query and response messages based on CPRs within the database 223. Further information regarding the general structure and operation of an ISTP may be found in the U.S. Pat. No. 5,586,177 to Farris et al.

In the embodiment of FIGS. 3 and 4, the routing of the call from the calling station 1B to the called subscriber station and the delivery of name and number caller ID to the subscriber's caller ID terminal 5 (if provided) operate in the same as described in detailed above with regard to the embodiment of FIGS. 1 and 2. The processing of forwarded calls in the third embodiment could be identical to that in the embodiment of FIGS. 3 and 4, except that the signaling between the switch 3A and the voice mail system 211 goes through one or more STPs. However, the preferred method for this embodiment involves a release of the session between the end office switching systems 3A and 3B upon detection of a need to forward to voice mail. Essentially, the terminating switch 3A instructs the originating switch 3B to redirect the call as a forwarded call to the voice mail system 211. As a result, the originating end office switching system 3B forwards the call over the multi-line hunt group 215 to the voice mail 'system 211 without the need for connection through a trunk over to the terminating office switch 3A. The originating end office switching system 3B provides the requisite signaling to the voice mail system 211, not the switch 3B as in the earlier embodiments.

The originating end office switching system 3B could query the LIDB database 9 to obtain the name information, in a manner similar to the query by the switch 3A. For example, the switch 3B might have the appropriate trigger set against the hunt group 215 if the profile for that line group shows a name and number type service, such as Caller ID Deluxe, set for the lines going to the voice mail system 211. However, such an operation by the switch 1B often duplicates the earlier query by the switch 3A, for example as made when the switch 3A first prepared to send a ringing signal to the station 1A.

In the preferred method for the embodiment of FIGS. 5 and 6, the SSP capable voice mail system will initiate a query transmission to the LIDB database 9, to obtain the name associated with the calling party number, whenever it receives a forwarded call. In some cases of calls to the subscriber at station 1A, the terminating end office switching system 3A will not perform a query to LIDB 9, for example, because the subscriber has activated call forwarding, the station 1A is busy, or the subscriber does not have a Caller ID Deluxe type of service. In such cases, when the forwarded call reaches the voice mail system 211 and that system launches its query, the ISTP 217 passes the query through to the LIDB 9, as in the example of FIGS. 3 and 4. The LIDB 9 sends back the name data, and the voice processing unit 25 serving the call stores the name and number data, as in the earlier example.

Consider now the situation where the caller has Caller ID Deluxe and the station is not busy or on call forwarding. Hence, the switch 3A will attempt to ring the line. For purposes of delivering the Caller ID Deluxe, the switch 3A will obtain the name from the LIDB 9, as in the example described with regard to FIGS. 1 and 2. As the query and the response pass back and forth through one of the paired ISTPs 217, however, the call processing record from the database 223 causes the communications controller 221 in the ISTP 217 to learn and retain the session number, the calling party number and the name delivered by the LIDB database 9, at least for the duration of the call. The communications controller 221 temporarily stores that information in its associated memory. The switch 3A will deliver the name and number to the terminal 5 as caller ID data, as in the earlier example. However, now assume that the called subscriber fails to answer, and the switch 3A recognizes the need to roll-over or forward the call into the voice mail system 211.

The terminating switch 3A provides an SS7 signaling message instructing the originating switch 3B to release the call attempt through the switch 3A and instead redirect the call as a forwarded call to the voice mail system 211. The originating end office switching system 3B forwards the call over the multi-line hunt group 215 to the voice mail system 211 and provides the requisite signaling to the voice mail system 211. The signaling identifies the calling and called telephone numbers and the reason for the call (forwarded), as in the earlier examples.

Within the voice mail system 211, a data unit and a CCIS terminal supply the signaling message data the MCU+ control unit 123 (see FIG. 4). The unit 123 uses the multi-line hunt group line information and the subscriber's directory number to internally route the forwarded call though DSS switch 121 and one of the internal T1 links 131 to an available voice processing unit 125, as described above. The MCU+ control unit 123 provides data to identify the relevant subscriber to that voice processing unit 25 via the Ethernet 29. The voice processing unit will answer the call, prompt the caller and receive/store any incoming audio message from the caller in the subscriber's mailbox, in essentially the normal manner.

At the beginning of this processing, the MCU+ control unit 123 also detects a PIC or trigger and recognizes a need to launch a query, as it did during similar processing in the embodiment of FIGS. 3 and 4. As in that earlier embodiment, the control unit 123 formulates an initial TCAP query message containing various information about the current call, including the calling party number. The MCU+ control unit 123 forwards that message data to one of the CCIS terminals 131 or 135, which formats the data into an SS7 packet. The CCIS terminal supplies the packet to the associated data set 133 or 137, which transmits the packet over the connected A-link to one of the ISTPs 217.

The query could go to the LIDB 9. In this embodiment, however, the ISTP 217 preferably recognizes that it has processed this call before, based on the session number within the query and that it has the data needed to respond. Hence, the communications controller 221 formulates the TCAP call control message, including the name data, and sends that message over the bus 225 to an appropriate one of the packet link interface modules 227. The module 227 transmits the message as an SS7 signaling message over the A-link back to the voice mail system 211.

Within the system 211, the TCAP call control message arrives at one of the data sets 133, 137. The data set forwards the SS7 data packet to the CCIS terminal 131 or 135, which extracts the message data from the SS7 packet and forwards the message data to the MCU+ control unit 123. In this instance, the MCU+ control unit 123 recognizes the response message as one containing requested name data. The unit 123 in turn forwards the name data to the voice processing unit 25 handling the forwarded call, via the Ethernet 29. The MCU+ control unit 123 also provides instructions/data to that voice processing unit 25 to cause the unit 25 to store the name data and the calling party telephone number in a call data file associated with the subscriber's voice mailbox and appropriately linked to any audio message deposited by the caller.

In this embodiment, the caller can review data about stored messages or other received calls and listen to any recorded audio messages in essentially the same manner as described above relative to operations of the earlier embodiments. In particular, this latest embodiment provides the same types of options to announce the full caller ID information (preferably name and number) to the subscriber, for all calls forwarded to the subscriber's mailbox.

The third embodiment also admits of a number of modifications within the spirit and scope of the invention. For example, the processing still involved a second query by the voice processing system 211 even though the LIDB had already provided the name information. The ISTP 217 only eliminated the need for the second query to go all the way back up to the LIDB database 9. An alternative call processing approach would be for the ISTP 217 to add the name data in its possession to one of the otherwise normal signaling messages going to the voice mail system 211 with the forwarded call. For example, when the end office switch 1B first sends a signaling message to the voice mail system 211, as the message passes through the ISTP 217, the ISTP would add the name data to an otherwise unused field of the message, for example in the Generic Address Parameter (GAP) field of the common channel signaling message. The voice mail system 211 would launch the query for the name only if the.name was absent from the initial signaling. In such a case, the query would go to the LIDB 9.

Those skilled in the art will recognize that the present invention has a broad range of applications, and the embodiments admit of a wide range of modifications, without departure from the inventive concepts. For example, another embodiment might rely on use of a subscriber-specific logic in a service control point (SCP) or an Integrated Services Control Point (ISCP). In such a case, the SSP switch or SSP voice mail system that hit the trigger, would signal the SCP/ISCP for instructions, and the instructions would cause that node to obtain and store the name information from the LIDB database, for further use in a manner analogous to the operations in the specific embodiments described above.

In a related alternative, the triggering may occur at the ISTP 217, which causes the ISTP to query the SCP or ISCP and then query the LIDB in response to an instruction from the SCP or ISCP. When the call hits an SSP, a query sent to or through the ISTP 217 causes the ISTP to set a bit in its temporary record for the session and send a query to the ISCP. Based on the subscriber's profile in the ISCP, the ISCP sends an instruction to obtain the name data from the LIDB database 9. The name data may be temporarily held in either the ISTP or the ISCP. When the ISTP 217 sets up the call to the SSP switching system 3A, and determines that the call must go to the voice mail system, the ISTP recognizes the signaling regarding that same call/session. When the network re-routes the call to voice mail, the ISTP therefore responds to the related signaling by retrieving the temporarily stored name data, from the ISCP or from within the ISTP itself. An instruction is provided to the serving end office switching system to cause it to insert the name with the other call signaling information to the, voice mail system, for example on the SMDI link.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A method of providing voice mail service with automatic caller identification through a telephone network comprising a traffic network with a plurality of central office switching systems and an interoffice signaling network, the method comprising:

detecting a need to forward a call intended for a voice mail subscriber to a voice mail system providing a voice mailbox for the subscriber;

identifying a telephone number associated with a calling station;

forwarding the call to the voice mail system;

receiving the telephone number in the voice mail system from an end office switching system coupled to the voice mail system;

obtaining name information corresponding to the telephone number by launching a query containing the telephone number from the voice mail system to a line identification database coupled to the interoffice signaling network, and receiving a response containing the name information in the voice mail system from the line identification database;

within the voice mail system, recording the telephone number and the name information received from the network in association with the voice mailbox of the subscriber;

converting the stored telephone number and name information to an audible announcement; and transmitting the audible announcement through the telephone network from the voice mail system to the subscriber, during a review of contents of the voice mailbox by the subscriber.

2. A method of providing voice mail service with automatic caller identification through a telephone network comprising a traffic network with a plurality of central office switching systems and an interoffice signaling network, the method comprising:

detecting a need to forward a call intended for a voice mail subscriber to a voice mail system providing a voice mailbox for the subscriber;

identifying a telephone number associated with a calling station;

launching a query containing the telephone number, from an end office switching system coupled to a voice mail system, to a line identification database via the interoffice signaling network;

transmitting a response containing name information corresponding to the telephone number to the end office switching system, from the line identification database, via a signaling transfer point of the interoffice signaling network;

forwarding the call to the voice mail system;

receiving the telephone number and the name information from the telephone network in the voice mail system, wherein the step of receiving comprises receiving at least the name information in the voice mail system in a subsequent signaling message from the signaling transfer point, via a link of the interoffice signaling network;

within the voice mail system, recording the telephone number and the name information received from the network in association with the voice mailbox of the subscriber;

converting the stored telephone number and name information to an audible announcement; and transmitting the audible announcement through the telephone network from the voice mail system to the subscriber, during a review of contents of the voice mailbox by the subscriber.

3. A method as in claim 2, wherein the step of receiving at least the name information in a subsequent signaling message from the signaling transfer point comprises:

launching another query from the voice mail system via the link of the interoffice signaling network; and receiving another response containing the name, in the voice mail system, from the signaling transfer point, over the link of the interoffice signaling network.

4. A method as in claim 2, wherein:

the step of receiving at least the name information in a subsequent signaling message from the signaling transfer point comprises receiving a signaling message regarding forwarding of the call from an end office switching system coupled to the voice mail system, at the voice mail system via signaling transfer point, and the signaling message regarding forwarding of the call includes the telephone number supplied from the end office switching system coupled to the voice mail system and contains the name supplied from the signaling transfer point.

5. A method of recording caller identification information from a telephone network in a mail system, the method comprising:

receiving a call intended for a subscriber in the mail system, forwarded from a central office switching system providing telephone network service to the mail system;

with the forwarded call, receiving a telephone number of a station of a calling party in the mail system;

launching a query containing the telephone number from the mail system, through an interoffice signaling network portion of the telephone network;

receiving a response containing a name corresponding to the telephone number in the mail system, via the interoffice signaling network;

storing the telephone number and the corresponding name in the mail system, in association with a mailbox for the subscriber;

converting the stored telephone number and the corresponding name to an audible announcement; and transmitting the audible announcement of the number and the name through the telephone network from the mail system to the subscriber, during a review of contents of the mailbox by the subscriber.

6. A method as in claim 5, wherein the step of receiving the telephone number comprises receiving a call-related signaling message containing the telephone number, over a link between the central office switching system and the mail system.

7. A method as in claim 5, herein the step of receiving the telephone number comprises receiving a call-related signaling message containing the telephone number over a link of the interoffice signaling network.

8. A method as in claim 5, wherein the mail system comprises a voice mail system, the method further comprising:

receiving an audible message from a caller through the telephone network in the voice mail system;

storing the audible message from the caller in the voice mail system in association with the telephone number and the corresponding name; and transmitting the audible message from the caller, through the telephone network from the voice mail system to the subscriber, during the review of contents of the voice mailbox by the subscriber.

9. A method as in claim 5, wherein the mail system launches the query to and receives the response from a line identification database.

10. A method as in claim 5, wherein the mail system launches the query to and receives the response from an intelligent signaling transfer point.

11. A telephone network for providing voice mail service and associated caller identification, the network comprising:

a plurality of central office switching systems interconnected by trunk circuits and coupled through subscriber links to customer premises equipment, for providing switched telephone service to and from the subscriber links;

an interoffice signaling network for carrying signaling messages, the interoffice signaling network comprising a signaling transfer point and signaling links between the signaling transfer point and the central office switching systems;

an identification database, coupled through a signaling link to the signaling transfer point for communication via the interoffice signaling network, the identification database storing data for translating telephone numbers to corresponding subscriber names;

a voice mail system, coupled through a subscriber link to one of the central office switching systems; and a signaling link between the voice mail system and the signaling transfer point, wherein the telephone network is programmed to perform the following steps:

detecting a need to forward a call intended for a predetermined subscriber to the voice mail system;

identifying a telephone number associated with a calling station;

obtaining name information corresponding to the telephone number from the line identification database via the interoffice signaling network;

forwarding the call to the voice mail system;

transmitting the telephone number and the name information to the voice mail system;

recording the telephone number and the name information in association with a voice mailbox of the predetermined subscriber;

converting the stored telephone number and name information to an audible announcement;

transmitting the audible announcement through the telephone network from the voice mail system to the predetermined subscriber, during a review of contents of the voice mailbox by the subscriber, wherein the voice mail system sends a query containing the telephone number through the interoffice signaling network and receives a response containing the name through the interoffice signaling network.

12. A telephone network for providing voice mail service and associated caller identification, the network comprising:

a plurality of central office switching systems interconnected by trunk circuits and coupled through subscriber links to customer premises equipment, for providing switched telephone service to and from the subscriber links;

an interoffice signaling network for carrying signaling messages, the interoffice signaling network comprising a signaling transfer point and signaling links between the signaling transfer point and the central office switching systems, wherein the signaling transfer point comprises an intelligent signaling transfer point;

an identification database, coupled through a signaling link to the signaling transfer point for communication via the interoffice signaling network, the identification database storing data for translating telephone numbers to corresponding subscriber names; and a voice mail system, coupled through a subscriber link to one of the central office switching systems, wherein the telephone network is programmed to perform the following steps:

detecting a need to forward a call intended for a predetermined subscriber to the voice mail system;

identifying a telephone number associated with a calling station;

obtaining name information corresponding to the telephone number from the line identification database via the interoffice signaling network;

forwarding the call to the voice mail system;

transmitting the telephone number and the name information to the voice mail system;

recording the telephone number and the name information in association with a voice mailbox of the predetermined subscriber;

converting the stored telephone number and name information to an audible announcement; and transmitting the audible announcement through the telephone network from the voice mail system to the predetermined subscriber, during a review of contents of the voice mailbox by the subscriber.

13. A network as in claim 12, wherein the intelligent signaling transfer point comprises:

interface modules for providing two-way data communications couplings to the signaling links;

a logical packet switching fabric coupled to the interface modules;

a database storing call processing data; and a program controlled processor coupled to the logical packet switching fabric, for controlling packet switching between interface modules across the logical packet switching fabric and for responding to at least one query message received in the intelligent signaling transfer point in accord with call processing data from the database.

14. A telephone network for providing voice mail service and associated caller identification, the network comprising:

a plurality of central office switching systems interconnected by trunk circuits and coupled through subscriber links to customer premises equipment, for providing switched telephone service to and from the subscriber links;

an interoffice signaling network for carrying signaling messages, the interoffice signaling network comprising a signaling transfer point and signaling links between the signaling transfer point and the central office switching systems;

an identification database, coupled through a signaling link to the signaling transfer point for communication via the interoffice signaling network, the identification database storing data for translating telephone numbers to corresponding subscriber names;

a voice mail system, coupled through a subscriber link to one of the central office switching systems; and a services control point, wherein the telephone network is programmed to perform the following steps:

detecting a need to forward a call intended for a predetermined subscriber to the voice mail system;

identifying a telephone number associated with a calling station;

obtaining name information corresponding to the telephone number from the line identification database via the interoffice signaling network;

forwarding the call to the voice mail system;

transmitting the telephone number and the name information to the voice mail system;

recording the telephone number and the name information in association with a voice mailbox of the predetermined subscriber;

converting the stored telephone number and name information to an audible announcement; and transmitting the audible announcement through the telephone network from the voice mail system to the predetermined subscriber, during a review of contents of the voice mailbox by the subscriber, the services control point storing a profile for the predetermined subscriber for controlling operations involved in obtaining and transmitting the name to the voice mail system.

15. A telephone network for providing voice mail service and associated caller identification, the network comprising:

a plurality of central office switching systems interconnected by trunk circuits and coupled through subscriber links to customer premises equipment, for providing switched telephone service to and from the subscriber links;

an interoffice signaling network for carrying signaling messages, the interoffice signaling network comprising a signaling transfer point and signaling links between the signaling transfer point and the central office switching systems;

an identification database, coupled through a signaling link to the signaling transfer point for communication via the interoffice signaling network, the identification database storing data for translating telephone numbers to corresponding subscriber names; and a voice mail system, coupled through a subscriber link to one of the central office switching systems, wherein the voice mail system comprises:

an interface connection to the one central office switching system for receiving calls;

at least one signaling interface, for connection of a signaling link;

a voice processing unit for transmitting audible messages via the interface connection and for storing audible messages received via the interface connection and the public switched telephone network; and a controller coupled to the voice processing unit for controlling operation of the voice mail system, wherein the telephone network is programmed to perform the following steps:

detecting a need to forward a call intended for a predetermined subscriber to the voice mail system;

identifying a telephone number associated with a calling station;

obtaining name information corresponding to the telephone number from the line identification database via the interoffice signaling network;

forwarding the call to the voice mail system;

transmitting the telephone number and the name information to the voice mail system;

recording the telephone number and the name information in association with a voice mailbox of the predetermined subscriber;

converting the stored telephone number and name information to an audible announcement; and transmitting the audible announcement through the telephone network from the voice mail system to the predetermined subscriber, during a review of contents of the voice mailbox by the subscriber.

16. A network as in claim 15, wherein the at least one signaling interface comprises an interface to a link of the interoffice signaling network.

17. A voice mail system for storing audible messages and caller identification data in association with mailboxes for subscribers, the voice mail system comprising:

an interface connection to a central office switching system of a public switched telephone network;

a voice processing unit for transmitting audible messages via the interface connection and the public switched telephone network and for receiving and for storing audible messages received via the interface connection and the public switched telephone network;

a controller coupled to the voice processing unit for controlling operation of the voice mail system; and a signaling link interface to the public switched telephone network, the signaling link interface comprising at least a connection to an interoffice signaling network portion of the public switched telephone network, wherein the controller is programmed so as to control operation of the voice mail system so as to execute the following steps:

receive a telephone number of a caller with signaling for a forwarded call for a specific subscriber's voice mailbox;

launch a query via the signaling link interface and the interoffice signaling network, the query containing the telephone number of the caller;

receive a response message via the interoffice signaling network and the signaling link interface, the response message containing a name corresponding to the telephone number of the caller;

store the name and the telephone number of the caller in association with the specific subscriber's voice mailbox;

store an audible message if any is received from the caller in association with the stored name and telephone number;

convert the stored name and telephone number to an audible announcement; and transmit the audible announcement of the name and telephone number along with the audible message if received through the public switched telephone network to the specific subscriber.

18. A voice mail system as in claim 17, wherein the signaling link interface further comprises a connection for a dedicated signaling link between the voice mail system and the central office switching system.

19. A voice mail system as in claim 17, wherein the controller and the signaling link interface provide service switching point capabilities for recognition of trigger events in call processing and signaling communication via the interoffice signaling portion of the public switched telephone network in response to detection of trigger events.

* * * * *